Nov. 28, 1939.   A. C. VELO   2,181,470
AUTOMATIC CLUTCH CONTROLLING MEANS
Filed Sept. 29, 1934   2 Sheets-Sheet 1
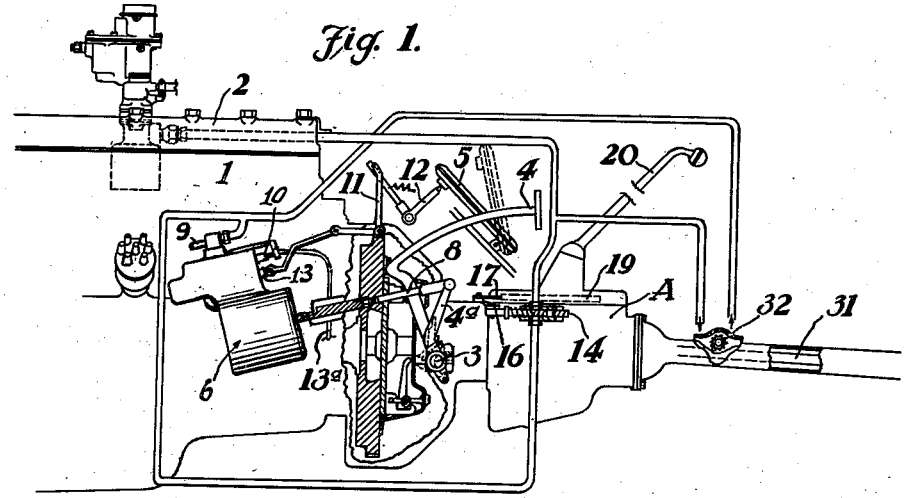
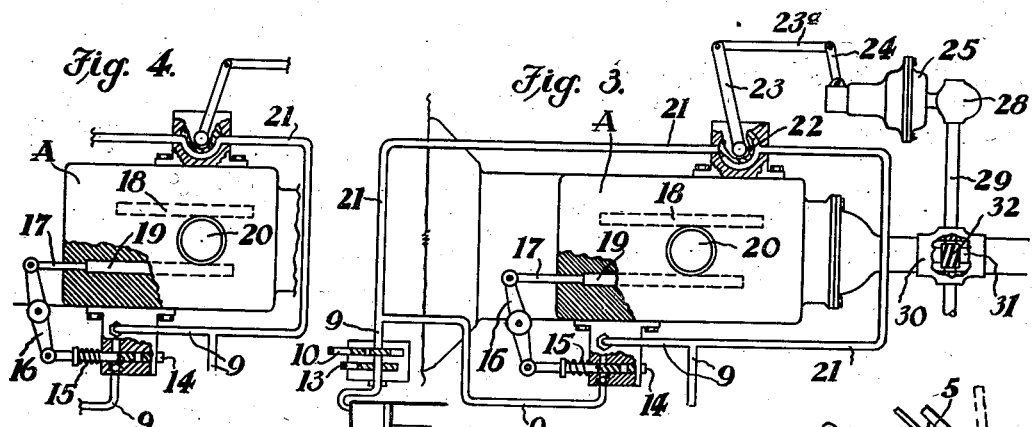
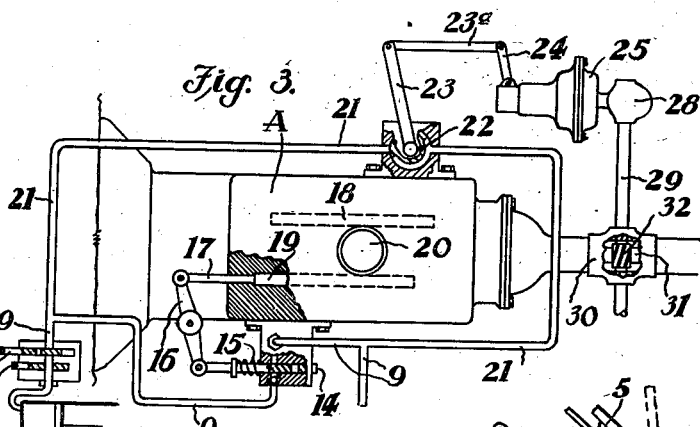
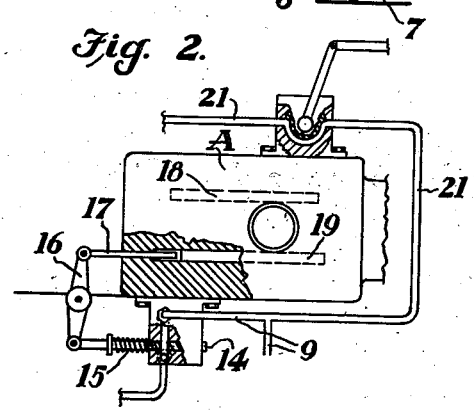
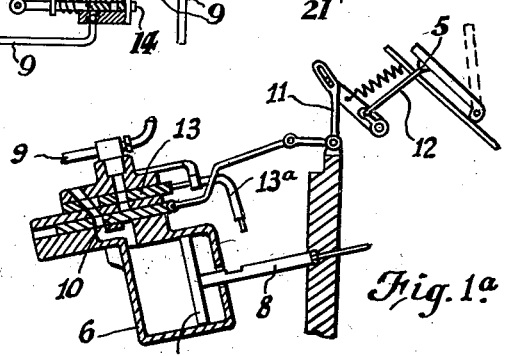
INVENTOR:
Anthony C. Velo,
BY
ATTORNEY.

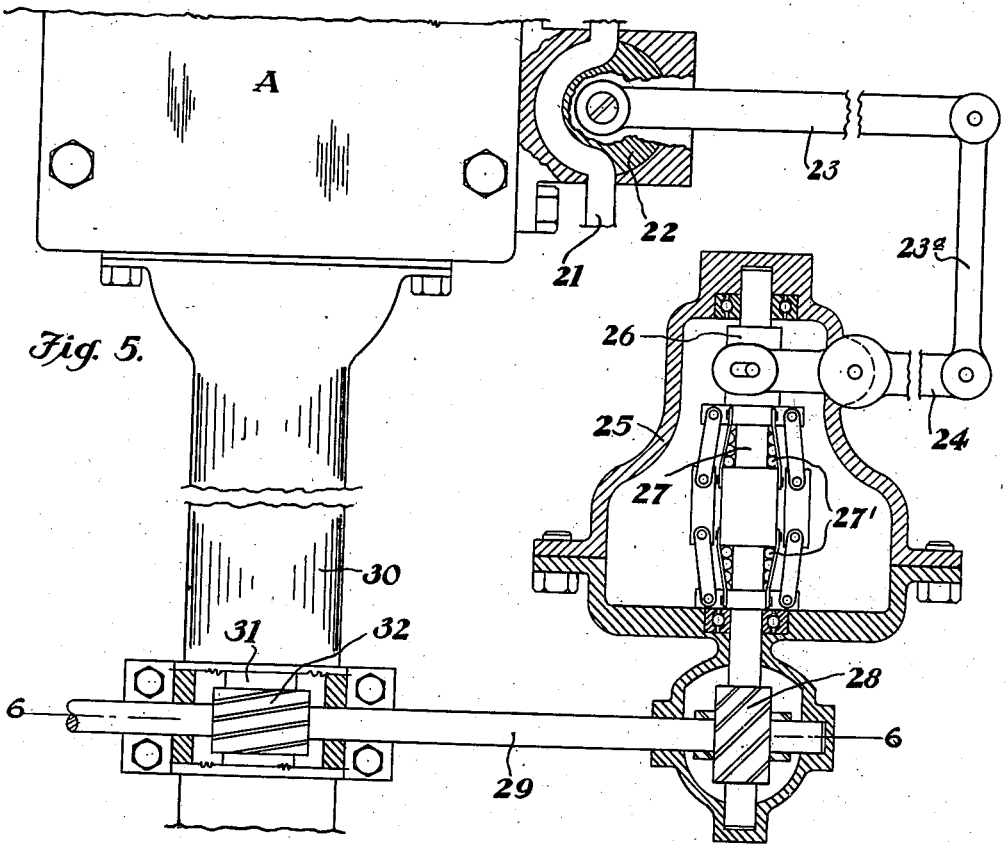
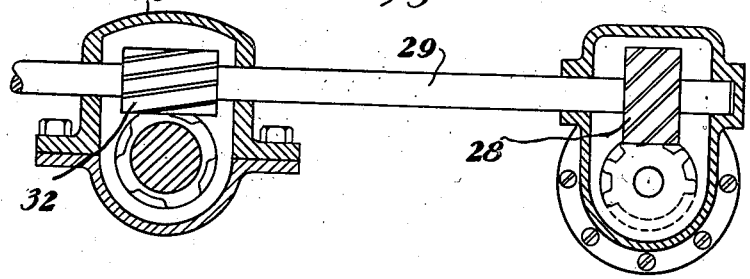

Patented Nov. 28, 1939

2,181,470

UNITED STATES PATENT OFFICE 2,181,470

AUTOMATIC CLUTCH CONTROLLING MEANS

Anthony C. Velo, Lancaster, Pa., assignor, by direct and mesne assignments, to Vaco Products, Inc., a corporation of Delaware Application September 29, 1934, Serial No. 746,243

32 Claims. (Cl. 192—.01)

This invention relates to means for controlling automobile clutches of the so-called automatic type, wherein the action of the clutch is governed by movement of a control element, for example the accelerator, in such manner that as long as the accelerator is depressed engagement of the clutch by its actuating spring is permitted, but upon release of the accelerator a vacuum-operated piston or equivalent power device is set into action thereby to disengage the clutch.

The use and operation of such an automatic clutch is of convenience and advantage in relieving the automobile driver from the labor and fatigue of actuating the clutch at frequent intervals when the vehicle is traveling at varying speeds in dense traffic and under conditions where frequent gear shift changes are necessary. The use and operation of such an automatic clutch is, however, disadvantageous and objectionable at other times, as when the vehicle is descending grades or traveling for more or less lengthy periods in high gear or under conditions where disengagement of the clutch and change gear actions are unnecessary. The driver can not, for example, remove his foot from the accelerator for the purpose of applying the foot brake or for any other purpose without a resultant automatic disengagement of the clutch, which is of obvious disadvantage when braking is necessary for temporarily checking speed or for controlling the vehicle in descending a grade, as in such action the braking effect of the idling engine on the running gear is nullified and a harder application of the brakes is required to control the vehicle. The clutch as a consequence is operated with greater frequency than necessary and the brakes must be operated more constantly and to a harder degree, resulting in excessive wear and tear on the clutch and brakes, while undesirably reducing the extent of control of the vehicle by the driver. For these reasons, also, the unintentional disengagement of the clutch when the vehicle is running in high gear is a source of annoyance and discomfort to the driver, as well as a danger hazard.

The primary object of my invention is to provide means which automatically throws the automatic clutch actuating device out of action and maintains it out of action at all times when the vehicle is in high gear and running above a predetermined high speed.

A further object of the invention is to provide means which renders the automatic clutch actuating device ineffective and inoperable for a clutch disengaging action by the accelerator when the vehicle is running in high gear and at a predetermined high speed.

A still further object of the invention is to provide a means which automatically governs the automatic clutch operating device to permit of the control thereof by the accelerator for clutch disengaging actions as required for gear shifting as long as the vehicle is running at speeds within the gear shift shift range, but will automatically throw the automatic clutch actuating device out of action and render it inoperative by the accelerator when the vehicle is running in high gear and at a predetermined speed above the gear shift shift range.

A still further object of the invention is to provide simple, reliable and efficient means, controlled in part by an element of the gear shift mechanism and in part by a governor connected with a driven element of the drive mechanism of the vehicle, for effecting these purposes.

A still further object of the invention is to provide a means controlled by the action of the transmission for rendering the clutch inoperable by the vacuum when the transmission is in high gear, and a means controlled by the vehicle speed for rendering the clutch operable by the vacuum when the transmission is in high gear but the vehicle speed drops to a point where shift from high to second gear is necessary, so as to make the clutch action automatic in both directions throughout the gear shift shift range and so as to avoid the necessity of a manual clutch shift in a translation from high to second gear.

With these and other objects in view, which will appear in the course of the subjoined description, the invention consists of the features of construction, combination and arrangement of parts, hereinafter fully described and claimed, reference being had to the accompanying drawings, in which:

Fig. 1 is a schematic view showing the application of the invention to cooperating parts of an automobile.

Fig. 1a is a sectional view of the clutch operator and control valve.

Fig. 2 is a diagrammatic plan view showing the control mechanism and related parts of the clutch actuating device as they appear in normal working position.

Fig. 3 is a view similar to Fig. 2 showing the transmission governed vacuum controlling or clutch valve closed to throw the automatic clutch actuating device out of action and also showing the speed governed by-pass valve in closed position.

Fig. 4 is a view similar to Fig. 2 showing the clutch controlled valve in cut out position and the speed controlled valve open for a by-pass action.

Fig. 5 is a sectional plan of parts of the organization, showing particularly the construction of the governor and the means for operating the governor controlled valve.

Fig. 6 is a section on line 6—6 of Fig. 5.

In the illustrated embodiment of my invention herein disclosed I have, for purposes of exemplification, shown the invention as applied to and adapted for use in connection with a well known type of vacuum-operated automatic clutch actuating device and an ordinary type of transmission employing a manually operable gear shift lever, but it is to be understood that this disclosure is for purposes of exemplification only and that my invention is not limited thereto, as the invention may be employed with any other suitable type of automatic clutch actuating device and any other suitable type of transmission or gear shift mechanism, whether operated manually by a gear shift lever or by any type of automatic gear shift means.

Referring now more particularly to the drawings, 1 designates the internal combustion engine of an automobile, 2 its exhaust manifold, 3 the clutch shaft, which may be the shaft of any suitable type of clutch (not shown) which is closed or engaged by an actuating spring, 4 the usual clutch pedal for manually operating the clutch, 4a the automatic clutch release fork lever, which pedal and fork lever are in practice operatively coupled to said shaft to permit independent operation of the clutch thereby in the usual way, and 5 the fuel control element or accelerator, herein shown in the form of a conventional type of depressible foot pedal. The automatic clutch actuating device employed in connection with these parts comprises, as essential features, a cylinder 6 having a piston 7 operating therein which is coupled by a connecting rod 8 to the fork release lever 4a, through a working movement of which in one direction the clutch is released or disengaged. The piston 7 is adapted to be operated by vacuum through suction produced by the engine, for which purpose the cylinder is connected through a suction tube or conduit 9 with the intake manifold 2. In this suction tube or conduit is a vacuum controlling valve 10 coupled by a linkage mechanism 11 to an actuating element 12 which is engaged by the accelerator pedal 5, the construction and arrangement being such that when the accelerator is depressed for fuel feed action to the engine the valve 10 is moved to closed position, in which it remains as long as the accelerator is held depressed, to close communication between the cylinder and intake manifold, and such that when the accelerator is released the valve 10 will be opened under the action of the accelerator return spring to open communication between the intake manifold and cylinder 6 for producing a vacuum in the latter to shift the piston 7 to clutch disengaging position, in which position the piston and clutch will be maintained as long as the engine is running and the accelerator disposed in release position. I have also shown in the conduit a cut-out valve 13 operable through a connection 13a by the driver by means of a button or other device (not shown) on the instrument board or pedal or other device on the floor board, whereby the automatic clutch device may be thrown out of service whenever desired.

In the suction conduit 9 is arranged an automatic cut off valve 14 which may be either of sliding or rotary type but which, as herein shown, is of sliding type and is normally maintained in open position by a spring 15. This valve is connected by a lever 16 to a sliding plunger 17. In Figs. 2, 3 and 4 are shown the shifter rods or bars 18 and 19 of the gear shift mechanism A, which rods or bars are actuated by the gear shift lever 20 or other suitable means, the rod or bar 18 serving to adjust the first speed and reverse gears and the rod or bar 19 to adjust the second speed and high speed gears. The plunger 17 is disposed so as to be engaged by one end of the rod or bar 19 and to be shifted outwardly by said rod or bar when the latter is moved to third or high speed shift position, in which operation the lever 16 is shifted from the position shown in Fig. 2 to that shown in Fig. 3, thereby moving the valve 14 to closed position against the resistance of its opening spring, whereby said valve closes the suction conduit to cut off communication between the cylinder 6 and intake manifold of the engine.

When the vehicle is standing still, or is being driven forwardly through the transmission at speeds within the gear shift shift range up to the predetermined maximum high speed shift change point, the valve device 14 will be maintained in open position by its spring 15, so that the vacuum operated clutch operating device functions in its normal way in gear shift actions under control of the accelerator pedal 5. As soon, however, as shift is made to high gear by movement of the bar 19 to its advanced position valve 14 will be closed to cut out communication between the automatic clutch device and the vacuum conduit to prevent actuation of the clutch by the accelerator 5 as long as the vehicle is running at the predetermined high speed or above the gear shift shift range, thereby rendering said device inoperative to actuate or disengage the clutch irrespective of any movements of its ordinary control valve 10 by the accelerator and linkage mechanism. I thus provide means, as thus far described, actuated by a moving part of the transmission mechanism, for automatically throwing the automatic clutch actuating device out of operation and maintaining it out of operation to prevent the automatic operation of the clutch at any and all times when the vehicle is running in high maximum gear beyond the gear shift speed shift range and until the transmission gearing is again shifted to a lower gear ratio.

I, however, also provide speed controlled automatic means whereby the vacuum clutch actuating device is rendered operable by the vacuum when the transmission is in high gear and the valve 14 closed but the speed of the vehicle drops to a point where shift from high gear to second gear is necessary, so as to make the clutch action automatic in both directions throughout the gear shift shift range and so as to avoid the necessity of a manual clutch operation in a translation back from high to second gear. This speed controlled automatic means comprises a by-pass conduit 21 connected to the main conduit 9 on opposite sides of the valve 14 and containing a speed control valve 22, which may be of rotary or other suitable type, that shown being of rotary type and provided with an actuating arm 23. This arm is connected by a link 23a to one end of a rocking lever 24 which is mounted on the casing of a centrifugal governor 25 driven from a part of the vehicle driving mechanism on the driven side of the transmission. The other arm of the lever 24 is pivotally coupled to the weight operated sliding sleeve 26 of the governor which is mounted as usual to rotate with the governor shaft 27 and to slide thereon, said sleeve operating on its reverse movements to transmit opposite rocking or opening and closing movements to the rotary valve. When the vehicle is standing still and the governor is inactive and the sleeve 26 is held at the limit of its outward movement by the governor spring 27' the valve 22 is open to the vacuum line and the governor action is such, when the vehicle is set into motion, that the valve remains open until the vehicle is running at a predetermined speed. This speed may be that speed at which the vehicle should be driven with the transmission in second gear, or that speed at which a gear change from high gear to second gear is necessary in a decrease of running speed of the vehicle, or approximately eight miles, more or less. The governor is set or adjusted so that in a speed increasing action from zero up to the predetermined speed, eight miles more or less, the valve 23 will remain open, as the centrifugal force acting on the governor arms in opposition to the spring 27' will not be sufficient until such speed is exceeded to slide the sleeve 26 inwardly to effect the closing of the valve. When, however, this speed is exceeded the action of centrifugal force on the governor arms in moving them outwardly will draw the sleeve 26 inwardly, thereby transmitting motion to the valve to close it and cut off suction through the by-pass to the cylinder of the automatic clutch actuating device. The valve will remain closed under any further increases in speed beyond the eight mile point and until the vehicle speed again drops to that point, at which time the governor sleeve will again move outwardly and return the valve to open position, thus again opening the by-pass portion of the vacuum conduit and placing the same in communication with the suction manifold of the engine and the cylinder of the automatic clutch actuating device. It will thus be understood that when the vehicle is running in high gear and at a speed in excess of eight miles per hour, more or less, no automatic actuation of the clutch can be effected through the release of the accelerator pedal, since both cut off valves 14 and 22 will be in cut out position. If, however, the speed of the car should fall to the second speed shift point mentioned, the action of the governor in shifting the valve 22 to open position at this time, notwithstanding the fact that the valve 14 is still closed because the shifter bar 19 is still in third speed position, will reestablish communication between the suction source and the cylinder 6 through the by-pass line 22 to render the automatic clutch operating device available to the vacuum upon the release of the accelerator pedal for automatic clutch actuation. The transmission gearing may then be shifted for a speed change action from high gear to second gear during the disengagement of the clutch, which is again closed as soon as the accelerator pedal is depressed. The valves 14 and 22 will in this action be restored to normally open position and the opening of the valve 14 will again permit normal clutch actuating movements to be made by the clutch actuating device for gear shift actions in the manner previously described.

It will thus be seen that my invention provides a means, in the form of the transmission controlled valve device 14, which permits the vacuum operated clutch actuating device to be normally controlled by the accelerator for automatically operating the clutch at all times throughout the gear shift speed ranges until a shift is made to high gear, at which time the valve 14, through the action of the shifter 19 on its high gear shift motion, will close said valve, which will cut out communication between the suction source and the vacuum clutch actuating device and render the latter ineffective for action by the vacuum, so that the driver may remove his foot from the accelerator for applying the foot brake or other purposes without a resultant automatic disengagement of the clutch, whereby the mentioned objections to automatic clutches of the character set forth are obviated in a simple and effective manner. Also it will be seen that my invention provides a means, in the form of the governor controlled valve device 22, which operates when the valve 14 is closed and the transmission is in high gear, to permit the vehicle to be operated between the maximum speed of the vehicle and any lower speed down to the predetermined low speed at which a change from high gear to low gear is necessary without nullifying the action of the valve 14, but that whenever such predetermined low speed is reached the valve 22 will operate through a by-pass action to render the clutch actuating device effective for clutch actuation by the vacuum on release of the accelerator so as to avoid the necessity of manually disengaging the clutch by means of the clutch pedal, and so that a shift to second gear may be made, as a result of which valve 14 will be again opened and normal conditions restored for automatic clutch actions in the usual way. By operating the valve 22 by means of a governor driven from a part of the drive mechanism on the driven side of the transmission, whereby the valve is controlled always by vehicle speed instead of by engine speed, an accurate operation of the valve at the desired predetermined speed is ensured.

The governor may be of adjustable type so that its action on the valve 22 may be varied to cause said valve to operate at any predetermined governing speed required, and in practice the governor may be mounted and driven from the vehicle driving mechanism in any suitable manner. In the present instance the valve 22 and governor are shown as being driven by worm gears 28 from a shaft 29 journaled in the housing 30 of the propeller shaft 31, which shaft 29 is in turn driven by worm gears 32 from the propeller shaft, but any other suitable means for driving the governor may be employed. The shaft 29 may in practice be the speedometer drive shaft suitably elongated or extended for the purpose.

From the foregoing description, taken in connection with the drawings, the construction and operation of my improved automatic clutch controlling means will be readily understood without a further and extended description, and it will be seen that a simple, reliable and effective type of means for the purpose is provided. It will, of course, be understood that the construction disclosed for the purpose may be modified as desired within the scope of the appended claims without departing from the spirit or sacrificing any of the advantages of the invention.

What I claim is:

1. The combination of an internal combustion motor providing a source for establishing differential pressure, a differential pressure operated clutch, a gear shift, a driven element at the driven side of the gear shift, a fuel control element, means effective to render the clutch operable by differential pressure when the fuel control element is in a predetermined position, means controlled by the gear shift to render the clutch ineffective for operation by differential pressure in such position of the fuel control element when the gear shift is in high gear, and speed controlled means effective in the operation of the driven element to render the clutch effective for operation by differential pressure in such position of the fuel control element when the gear shift is in high gear and the driven element is moving at a speed determined for shift of the gear shift from high to second gear.

2. The combination of an internal combustion engine providing a source for establishing differential pressure, a differential pressure operated clutch, a gear shift, a driven element, a fuel control element, means effective to render the clutch normally operable by the vacuum when the fuel control element is in a predetermined position and the speed of the driven element allows shifts of the gear shift in its range between neutral and high gear, means effective to render the clutch ineffective for operation by differential pressure in such position of the fuel element when the gear shift is shifted to high gear, and means effective to restore control to the control element for differential pressure operation of the clutch when the gear shift is in high gear and the speed of the driven element decreases from a high gear speed to a speed suitable for gear shift from high gear to the next lower gear.

3. The combination of an internal combustion engine providing a source for establishing differential pressure, a differential pressure operated clutch, a gear shift, a driven element, a fuel control element, means effective to render the clutch normally operable by differential pressure when the fuel control element is in a predetermined position, a control valve governed by the gear shift in its movement to high gear to render the clutch ineffective for operation by differential pressure in such position of the fuel control element, and a control valve governed by the speed of the driven element and operating when the speed of the driven element drops below high speed while the gear shift is in high gear to render the clutch effective for operation by the fuel control element for shift from high gear to the next lower gear.

4. The combination of an internal combustion engine, providing a source for establishing differential pressure, a differential pressure operated clutch, a gear shift, a driven element, a fuel control element, means effective to render the clutch normally operable by differential pressure when the fuel control element is in a predetermined position, a gear shift controlled valve operative when the gear shift goes into high gear to render the clutch ineffective for operation by differential pressure in such position of the fuel control element, and a shunt valve controlled by the speed of the driven element for shunting the first-named valve out of action when the gear shift is in high gear and the speed of the driven element drops from high speed suitable for a change of the gear shift from high gear to a lower gear.

5. In an automobile driving means, the combination of an internal combustion engine providing a source for establishing differential pressure, a driven shaft, a gear shift, a differential pressure operated clutch, a clutch control element, a valve device effective to render the clutch normally operable by differential pressure when the fuel control element is in a predetermined position, a valve device operative by the gear shift mechanism on its movement into high gear for rendering the clutch ineffective for operation by the control element, a third valve device for shunting the second-named valve device out of action and rendering the first-named valve device operative under control of the control element to render the clutch operable by differential pressure when the gear shift is in high gear and upon a decrease in speed of the driven element from high speed to a speed suitable for a gear change from high gear to the next lower gear, and a governor controlled by the speed of the driven element and controlling the action of the third valve.

6. In an automobile driving means, the combination of an internal combustion engine providing a source for establishing differential pressure, a driven shaft, a gear shift, a differential pressure operated clutch, a clutch control element, a valve device effective to render the clutch normally operable by differential pressure when the fuel control element is in a predetermined position, a valve device operative by the gear shift mechanism on its movement into high gear for rendering the clutch ineffective for operation by the control element, a third valve device for shunting the second-named valve device out of action and rendering the first-named valve device operative under control of the control element to render the clutch operable by differential pressure when the gear shift is in high gear and upon a decrease in speed of the driven element from high speed to a speed suitable for a gear change from high gear to the next lower gear, a governor controlling the action of the third valve, and means for driving the governor from the driven element.

7. In an automobile driving means, the combination of an internal combustion engine providing a source for establishing differential pressure, a driven shaft, a gear shift, a differential pressure operated clutch, a clutch control element, a valve device effective to render the clutch normally operable by differential pressure when the fuel control element is in a predetermined position, a valve device operative by the gear shift mechanism on its movement into high gear for rendering the clutch ineffective for operation by the control element, a third valve device for shunting the second-named valve device out of action and rendering the first-named valve device operative under control of the control element to render the clutch operable by differential pressure when the gear shift is in high gear and upon a decrease in speed of the driven element from high speed to a speed suitable for a gear change from high gear to the next lower gear, a centrifugal governor controlling the action of the third valve, and a driving connection between said third valve, governor, and the driven element.

8. The combination, in an automotive vehicle, of an internal combustion engine, a vacuum operated clutch, a control element for controlling the supply of fuel to the engine, a valve operated thereby for controlling the availability of the vacuum to the clutch, a variable gear shift, a valve governed by said gear shift for rendering the clutch operable or inoperable by said control element and the first-named valve in predetermined shift positions of the gear shift, and a valve operable to control the availability of the vacuum to the clutch without regard to the control action of the second-named valve.

9. The combination, in a motor vehicle, of vehicle driving mechanism including an engine provided with a throttle, a clutch, and gear shifting mechanism including a power device connected to the motor vehicle clutch, control means operated upon movement of the engine throttle to idling position for rendering the power device operative for disengaging the clutch, control means operative by a moving part of the gear shifting mechanism in a gear shift action for rendering the power device operable or inoperable by said control means, and control means responsive to the action of a part of the vehicle driving means at the driven side of the gear shifting mechanism for rendering the power device operative by the first-named control means for disengaging the clutch without regard to the control action of the second-named control means.

10. In an automobile, a drive mechanism including a driving motor and a change speed mechanism driven by the motor, a clutch device for connecting said drive mechanism with and disconnecting it from the motor, a power operated clutch actuating device, a control element for throwing the clutch actuating device into and out of action, control means dependent upon and operating automatically in a predetermined shift position of the change speed mechanism for rendering said clutch device inoperable by said control element, and means responsive to action of the drive mechanism at the driven side of the change speed mechanism for rendering the clutch device operable by the control element independent of said control means.

11. In an automobile, a driving motor, a variable speed gear shift mechanism driven by the motor and including a clutch device for connecting said mechanism with and disconnecting it from the motor, a power operated clutch actuating device, a driven element at the driven side of the gear shift mechanism, a control element for throwing the clutch actuating device into and out of action, control means operated by the gear shift mechanism on a gear shift action therefor for rendering said clutch device inoperable by said control element, and means responsive to the action of the driven element for rendering the clutch device operable by the control element independent of said control means.

12. In an automobile, a driving motor, driven mechanism driven by the motor and including a clutch device and a change speed gearing for connecting said drive mechanism with and disconnecting it from the motor, a driven element at the driven side of the change speed gearing, a power operated clutch actuating device, a control element for throwing the clutch actuating device into and out of action, control means governed in action by gear operation of a part of the change speed gearing for rendering said clutch device inoperable by said control element when the change speed gearing is in high gear, and automatic control means operative by said driven element when the change speed gearing is in high gear and the speed of the vehicle descends to a point where shift to a lower gear should be made for rendering said control element effective for a clutch disengaging action.

13. In an automobile, a driving motor, a variable speed change mechanism driven by the motor and including a clutch device for connecting said drive mechanism with and disconnecting it from the motor, a driven element at the driven side of the variable speed change mechanism, a power operated clutch actuating device, a control element for throwing the clutch actuating device into and out of action, control means controlled by speed shift actions of the drive mechanism for rendering said clutch actuating device operable or inoperable by the control element, and means controlled by said driven element for rendering the clutch actuating device operable by the control element independent of and without regard to the control action of said control means.

14. In an automobile, a driving motor, driven mechanism driven by the motor and including a gear shift mechanism and a clutch device for connecting said gear shift mechanism with and disconnecting it from the motor, a power operated clutch actuating device, a control element for throwing the clutch actuating device into and out of action, and devices operated respectively by the gear shift mechanism and a part of the drive mechanism at the driven side of the gear shift mechanism and constantly in gear with the drive wheels of the vehicle for respectively rendering said clutch actuating device inoperable and operable by the control element when the gear shift is in predetermined shift positions.

15. The combination, in an automotive vehicle, having vacuum producing means, of a vacuum operated clutch, a control valve controlling the availability of the vacuum to the clutch, a variable gear shift, a valve controlled by a moving part of the gear shift in a gear shift action for rendering the clutch operable or inoperable by the first-named valve, and a valve for controlling the availability of the vacuum to the clutch under action of the first-named valve independent of the second-named valve.

16. In an auto vehicle, the combination of an internal combustion engine, a clutch, a power device operable by power produced by the action of the engine to actuate the clutch, a control element for rendering the clutch operable by said power device, a variable gear shift, a driven element at the driven side of the gear shift, control means controlled by the gear shift to render said power device inoperable to actuate the clutch when the gear shift is in a predetermined high speed shift position, and means controlled by said driven element for rendering the clutch operable by said power device independent of said control means and when the gear shift is in such predetermined high speed shift position to allow shift of the gear shift to a lower speed shift position.

17. The combination of an internal combustion engine, a clutch, a variable gear shift, a driven element at the driven side of the gear shift, a power device operable by power produced by the action of the engine to actuate the clutch, a control element for rendering the clutch operable by said power device, control means responsive to the action of the variable gear shift for rendering said power device operable or inoperable to actuate the clutch at predetermined shift positions of the gear shift, and means controlled by said driven element for rendering the clutch operable by the power device independent of the control action of said control means.

18. The combination of an internal combustion engine, a vacuum operated clutch, a variable gear shift, a valve for controlling the availability of the vacuum to the clutch for clutch disengaging actions, a valve operative by the gear shift in a predetermined high speed shift position thereof for rendering the clutch inoperable by the first-named valve, and a valve governed by vehicle speed and controlling the availability of the vacuum to the clutch under control of the first-named valve independent of the second-named valve.

19. The combination of an internal combustion engine, a vacuum operated clutch, a variable gear shift, a fuel control element, a valve governed by said element for controlling the availability of the vacuum to the clutch for clutch disengaging actions, a valve operative by the gear shift in a predetermined high speed shift position thereof for rendering the clutch inoperable by the first-named valve, and a valve governed by vehicle speed and operative in such operative position of the second-named valve and such predetermined high speed shift position of the gear shifts for controlling the availability of the vacuum to the clutch under control of the first-named valve independent of the second-named valve.

20. In an automobile, the combination of a change speed gearing, a clutch, a differential pressure operated power device for operating the clutch, a power control valve for controlling the operation of said power device, a device operated by the gear shift when said gear shift is in high gear for rendering said power control valve ineffective at such time for controlling the operation of the power device, and a valve responsive at a predetermined speed of the vehicle for rendering said gear shift operated device ineffective and rendering said power control valve effective for controlling the operation of the power device while the gear shift is in high gear.

21. In an automobile, the combination of a change speed gearing, a clutch, a power device for operating the clutch, an accelerator, an accelerator operated power control device for controlling the operation of said power device, a driven element at the driven side of the change speed gearing, a device operated by the gear shift for rendering the power device ineffective for controlling the power device when said gear shift is in high gear, and a device governed by said driven element at a predetermined driven speed for rendering said gear shift operated device ineffective and rendering said power control device effective for controlling the power device while the gear shift is in high gear.

22. In an autovehicle, the combination of a change speed gearing, a clutch, a power operated device for operating the clutch, a power control device for controlling the power operation of said power device, a device adapted to be thrown into action by the gear shift when the gear shift is in high gear for rendering said power control device ineffective for controlling the power device, a power controlling by-pass whereby in the high gear position of the gear shift the control power may be transferred from the gear shift controlled device to the power control device, and a speed controlled device controlling the by-pass to render the same operative for such power transfer control action at a predetermined vehicle speed.

23. In an autovehicle, the combination of a change speed gearing, a clutch, a power device for operating the clutch, an accelerator, an accelerator operated power control device for controlling the operation of said power device, a device operated by the gear shift for rendering the power control device ineffective when said gear shift is in high gear, a power controlling by-pass whereby in the high gear position of the gear shift the control of power may be transferred from the gear shift controlled device to the power control device, and a speed controlled device controlling the by-pass for the transfer of power from the gear shift controlled device to the power control device at a predetermined vehicle speed while the gear shift is in high gear.

24. In an automotive vehicle, a change speed gearing, a power operated clutch, a power control device controlling the power operation of the clutch for clutch disengaging actions in gear shift changes, a device for rendering the power control device ineffective for controlling the clutch when the change speed gearing is in high gear, and speed controlled means for restoring power control of the clutch to the power control device at a predetermined speed of the vehicle.

25. In an autovehicle, the combination of a change speed gearing, a fluid pressure operated clutch, a power control valve for normally controlling the operation of the clutch, a valve operated by the gear shift when the gear shift is in a predetermined gear position for rendering said power control valve ineffective for clutch control actions, and a valve responsive to predetermined vehicle speed for rendering said gear shift operated valve ineffective and the power control valve effective for clutch control actions.

26. In an autovehicle, the combination of a change speed gearing, a fluid pressure operated clutch, an accelerator, an accelerator operated power control valve for normally controlling the operation of the clutch, a valve operated by the gear shift for rendering said power controlling valve ineffective for clutch control operations when the gear shift is in a predetermined gear position, and a valve responsive to predetermined vehicle speed for rendering said gear shift operated valve ineffective and rendering said power control device effective for controlling the operation of the clutch while the gear shift is in such predetermined gear position.

27. In an autovehicle, the combination of a change speed gearing, a fluid pressure operated clutch, a power control valve for normally controlling the operation of the clutch, a valve operated by the gear shift for rendering the power control valve inoperative to control the operation of the clutch when the gear shift is in high gear, a normally inactive power controlling by-pass adapted in active condition to render the gear shift controlled valve inoperative and the power control valve operative for the clutch control actions, and a speed controlled valve controlling the by-pass to render the same active or inactive.

28. In an autovehicle, the combination of a differential pressure producing system, a change speed gearing, a differential pressure operated clutch, an accelerator operated control valve in said system for normally controlling the operation of the clutch, a valve in said system operated by the gear shift for preventing operation of the clutch by the control valve when the gear shift is in high gear, a by-pass in said system about the gear shift controlled valve, and a speed controlled valve controlling the by-pass for rendering the gear shift operated valve ineffective and the accelerator operated valve effective for operating the clutch at a predetermined vehicle speed while the gear shift is in high gear.

29. In an automotive vehicle having a change speed gearing and a clutch, a differential pressure power device for operating the clutch, a power control valve in said system for normally controlling the operation of the clutch for clutch disengaging actions in gear shift changes, a valve operated by a part of the change speed gearing for rendering the power control valve inoperative to control the power device when the change speed gearing is in high gear, and means for rendering said gear shift control valve inoperative when in active position and rendering the power control valve operative for governing the power device while the change speed gearing is in high gear and the vehicle speed is above a predetermined limit.

30. The combination of an internal combustion engine, a differential pressure controlled clutch, a variable gear shift, a valve governing the differential pressure control of the clutch for effecting clutch disengaging actions, a valve movable to a position by the gear shift in a predetermined high speed position of the latter for preventing differential pressure control of the clutch for clutch disengaging actions, and a valve operative in such position of the second-named valve and such predetermined high speed position of the gear shift for rendering effective differential pressure control of the clutch for clutch disengaging actions by the first-named valve.

31. The combination of an internal combustion engine, a differential pressure controlled clutch, a variable gear shift, a valve governing the differential pressure control of the clutch for effecting clutch disengaging actions, a valve movable to a position by the gear shift in a predetermined high speed position of the latter for preventing differential pressure control of the clutch for clutch disengaging actions, and a valve governed by vehicle speed and automatically operative in such position of the second-named valve and such predetermined high speed position of the gear shift for rendering effective differential pressure control of the clutch for clutch disengaging actions by the first-named valve.

32. The combination of an internal combustion engine, a differential pressure controlled clutch, a fuel control element, a valve operative by said fuel control element for governing the differential pressure control of the clutch for effecting clutch disengaging actions, a valve movable to a position by the gear shift in a predetermined high speed position of the latter for preventing differential control of the clutch for clutch disengaging actions, and a valve governed by vehicle speed and operative in such position of the second-named valve and such predetermined high speed position of the gear shift for rendering effective differential control of the clutch for clutch disengaging actions by the fuel control element and first-named valve.

ANTHONY C. VELO.